United States Patent [19]
Silberman

[11] Patent Number: 5,908,274
[45] Date of Patent: Jun. 1, 1999

[54] VEHICLE RESTRAINT ASSEMBLY

[76] Inventor: Scott A. Silberman, 1838 Doral Ct., Bloomfield Hills, Mich. 48302

[21] Appl. No.: 08/920,461

[22] Filed: Aug. 29, 1997

[51] Int. Cl.$^6$ ...................................................... B60P 7/08
[52] U.S. Cl. .................................... 410/10; 410/7; 410/8; 410/12; 410/30; 410/100; 24/68 CD
[58] Field of Search ............................. 410/7–12, 19–21, 410/23, 30, 50, 97, 100; 248/499; 188/32; 24/265 CD, 265 H, 68 CD, 698.1, 302

[56] References Cited

U.S. PATENT DOCUMENTS

| | | | |
|---|---|---|---|
| 3,348,273 | 10/1967 | Hall | 410/23 |
| 3,826,473 | 7/1974 | Huber | 24/68 CD X |
| 4,960,353 | 10/1990 | Thorndyke | 410/10 X |
| 5,037,255 | 8/1991 | Bullock et al. | 410/30 |
| 5,294,221 | 3/1994 | Eller et al. | 410/30 |
| 5,302,063 | 4/1994 | Winsor | 410/30 |
| 5,312,213 | 5/1994 | Winsor | 410/9 |
| 5,316,421 | 5/1994 | Bullock et al. | 410/9 |
| 5,542,798 | 8/1996 | Rawdon et al. | 410/100 |
| 5,560,086 | 10/1996 | Huang . | |

FOREIGN PATENT DOCUMENTS 157253  7/1978  Netherlands .............................. 410/30

*Primary Examiner*—Stephen T. Gordon
*Attorney, Agent, or Firm*—Young & Basile, P.C.

[57] ABSTRACT

A restraint assembly for securing an automotive vehicle to a flat-bed transport vehicle is adapted for use along with wheel chocks. The restraint assembly includes a synthetic, woven webbing strap having ends which are cut cold rather than by a heated blade; a standard, off-the-shelf ratchet mechanism with which the strap is engaged; a vehicle attachment hook attached to a second end of the strap; and a J-shaped hook for engaging a hole on the transport vehicle, the J-hook having a return bend that is approximately 180° in arc length and an extended free end. The geometry of the J-hook serves to substantially prevent the ratchet mechanism from becoming disengaged from the transport vehicle due to bouncing of the restrained automotive vehicle on its suspension. Cold cutting the end of the strap result in a soft, brush-like tip, rather than a hard bead of re-solidified plastic material as is caused by the heat cutting and sealing process normally used to cut synthetic webbing, and thus prevents excessive frictional heating of the strap caused by bouncing of the vehicle.

6 Claims, 3 Drawing Sheets

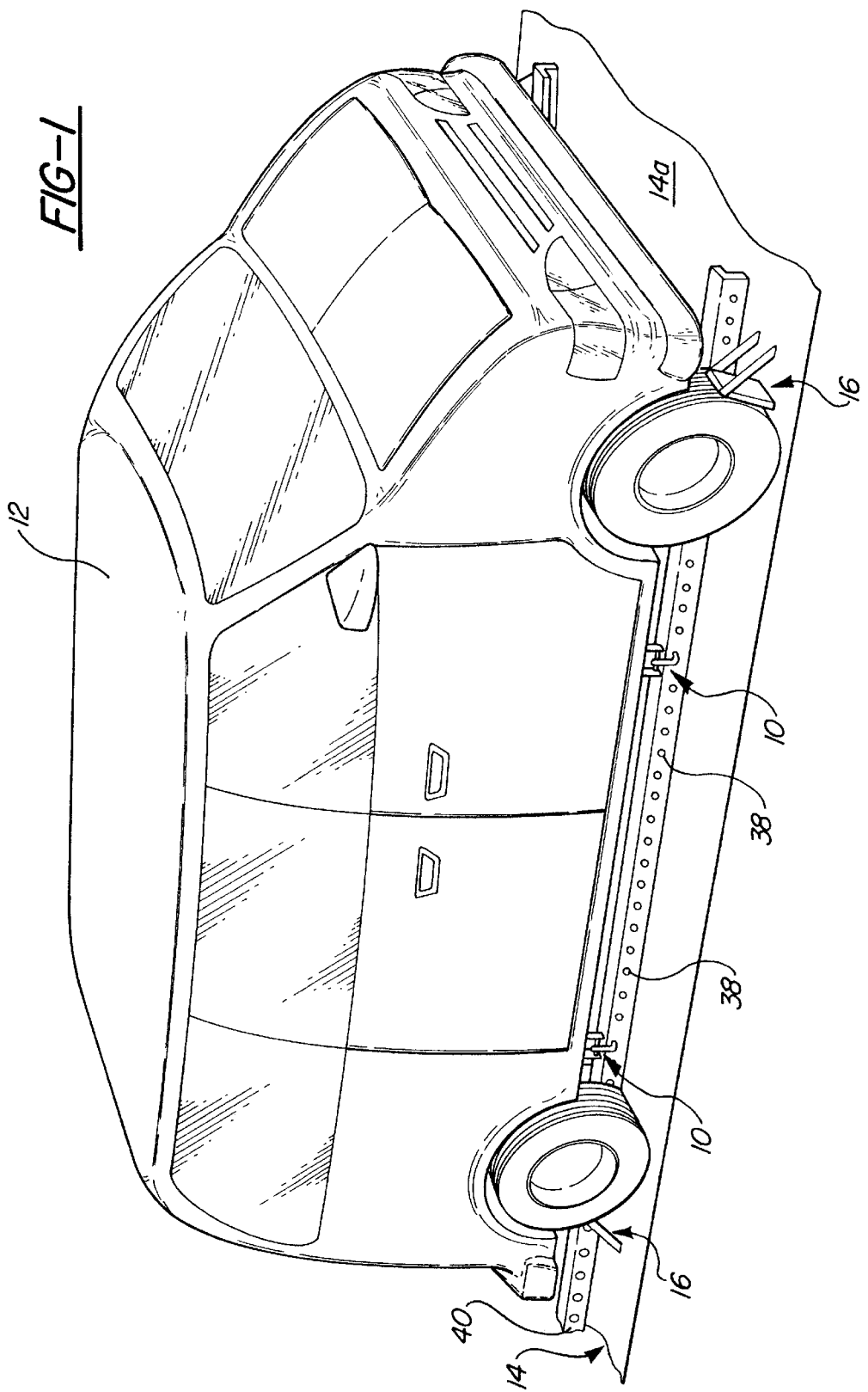

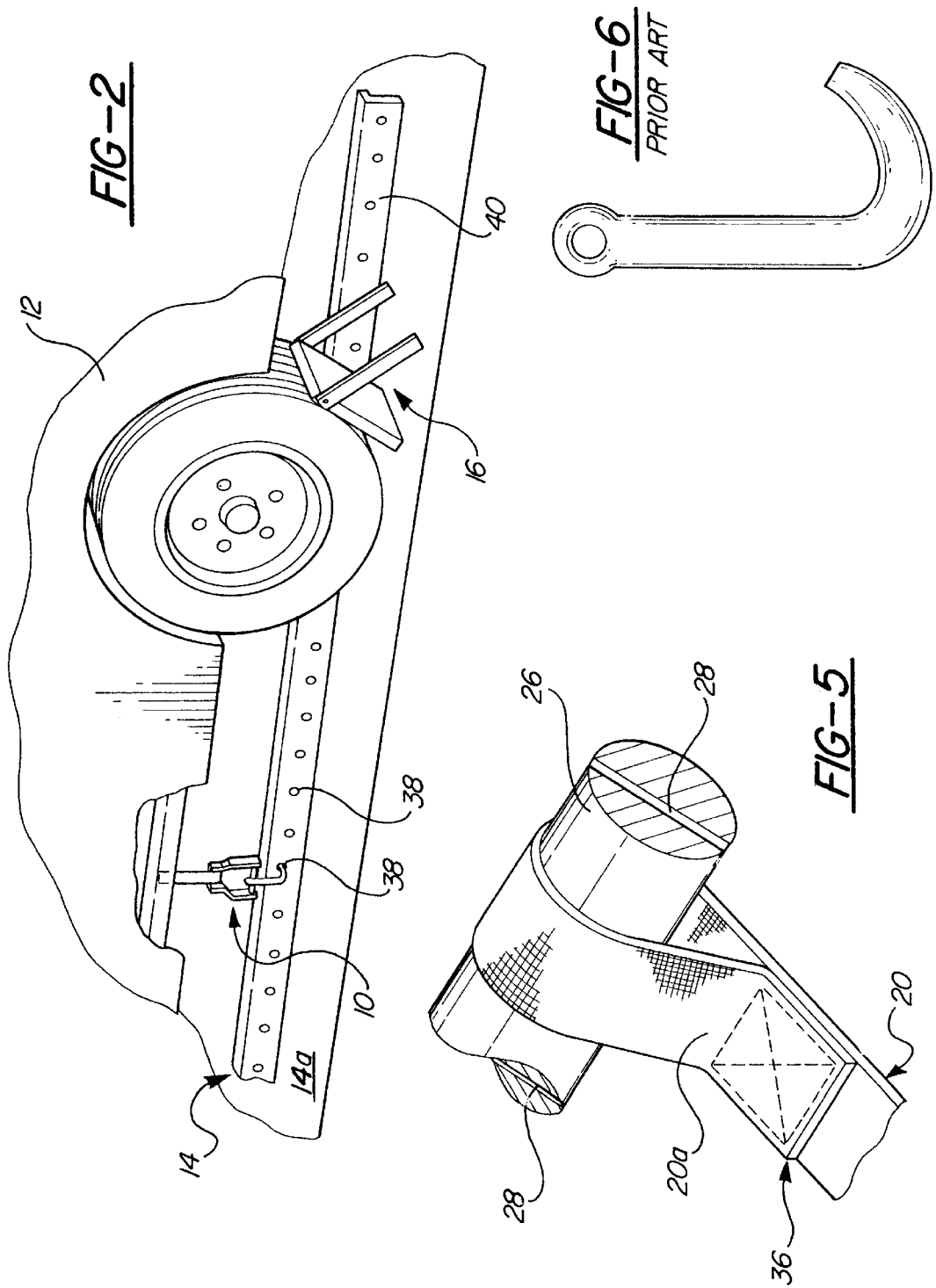

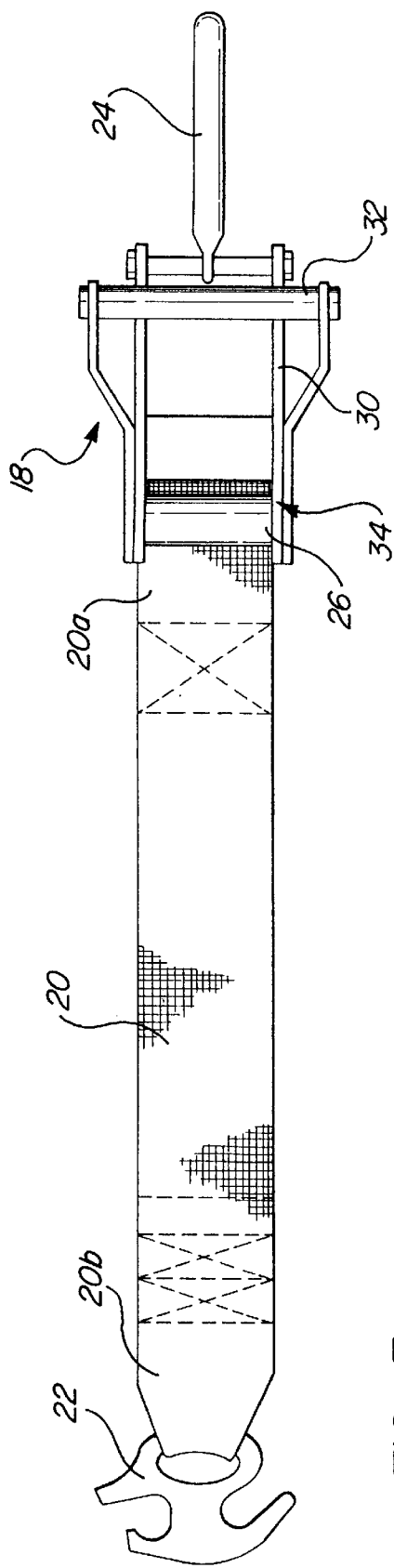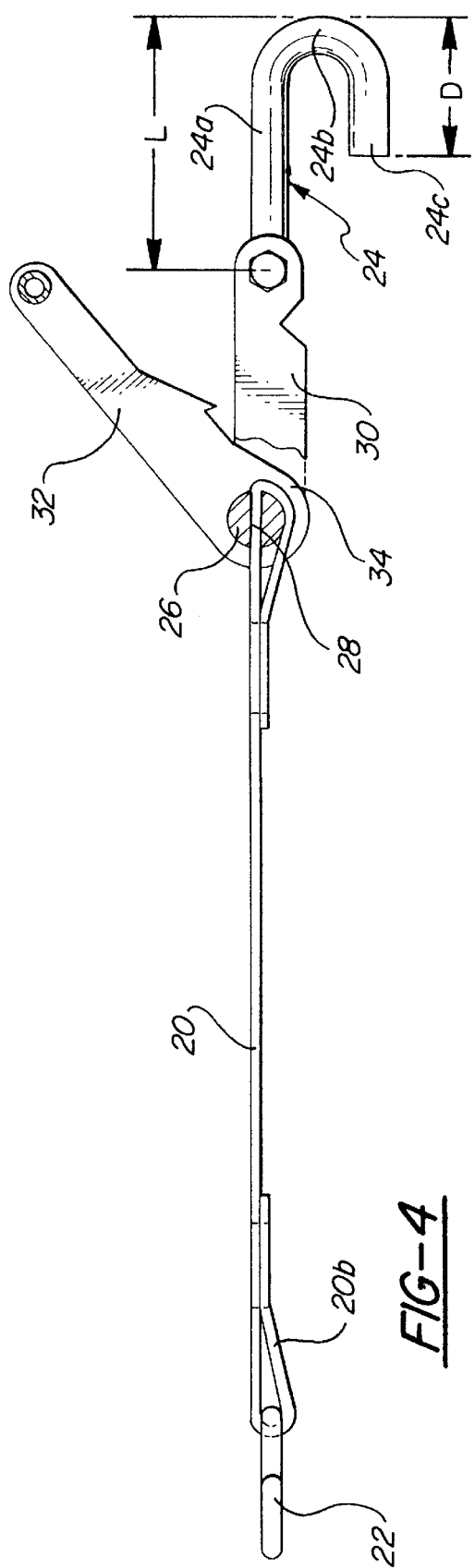

VEHICLE RESTRAINT ASSEMBLY

FIELD OF THE INVENTION

The present invention relates to a vehicle restraint system for securing automotive vehicles transported on flat-bed railway cars, trailers or on other similar transport vehicles. More particularly, the present invention relates to a ratchet-and-strap restraint device for use in combination with wheel chocks to compress the vehicle suspension in order to provide more vertical clearance between the top of the vehicle and an enclosed transport vehicle.

BACKGROUND OF THE INVENTION

Various anchoring or restraint methods are known for securing automotive vehicles to a flat-bed transport vehicle to prevent shifting of those automotive vehicles during shipping from a manufacturing facility to a delivery location. A commonly used method is to tie the vehicles downwardly to the support surface, e.g. the floor of a railway flat-bed car, using chains which are tightened by ratchet mechanisms. An end of a chain is attached to the chassis or frame of the vehicle and a hook on the ratchet mechanism is attached to a hole in a steel runner or rail on the support surface. The ratchet is then actuated to tighten the chain and partially or completely compress the springs of the vehicle's suspension system. Normally, one chain and ratchet combination is positioned adjacent each of the vehicle's wheels.

In an attempt to decrease the length of time required to secure a vehicle to a flat-bed transport vehicle, wheel chocking devices have been developed. One example of a vehicle wheel chocking device is disclosed in U.S. Pat. No. 5,312,213. In general, wheel chocks are positioned in front of or behind each front and rear wheels and secured to some portion of the transport vehicle support surface. Such wheel chocks have been found to adequately restrain vehicles against horizontal movement with respect to the flat-bed, but do not restrain the body of the vehicle against bouncing on its own suspension system while the flat-bed is in motion. Such bouncing can cause wear and tear on the suspension system during pre-delivery shipping of the vehicle.

More significantly, unrestrained bouncing of the vehicle may cause damage to the vehicle body. Automotive vehicles are often transported on double-decker railway cars to permit carriage of twice as many vehicles as would be possible on a single deck car. It has been found that bouncing of the vehicles can be severe enough that the vehicles carried on the lower deck strike the underside of the upper deck above them, causing significant damage to the roof of the vehicle. This is most commonly a problem for tall vehicles, such as full-size vans.

To prevent bouncing of the restrained vehicles, attempts have been made to use ratchet tie-down mechanisms along with wheel chocks. It is, of course, possible to use the expensive and cumbersome chain-and-ratchet devices employed previously and which the wheel chocks were intended to replace. For reasons of lower cost and greater ease and safety during use, it would be preferable to use a restraint system that employs woven, synthetic webbing straps. Such ratchet-and-strap devices are used in a wide variety of industrial applications, and are procurable off-the-shelf for a relatively low price.

Unfortunately, it has been found to be very difficult, when using an off-the-shelf ratchet mechanism, to generate enough leverage to tighten the restraint straps to the point where they completely compress or "bottom out" the suspension of the vehicle. During tests conducted with General Motors Corporation ¾-ton and 1-ton vans, the best that can be achieved in normal operating conditions is to compress the suspension approximately 2½ inches out of a total travel of approximately 4 inches. Accordingly, while the straps are able to restrain the vehicle against bouncing upward and so prevent the top of the vehicle from striking the overhead structure of the transport vehicle, some degree of bouncing downwardly from the restrained position may still occur. This bouncing may at times be large enough in magnitude that a restraint strap can become sufficiently slack to allow the prior art hooks used to restrain vehicles to a transport vehicle (see FIG. 6) to come unhooked from the hole, eyelet, or other feature with which it is engaged.

Existing ratchet-and-strap restraint devices have also been found to be unusable in this environment because of failures of the webbing strap itself. When the ratchet mechanism is actuated to tighten the strap, the strap is wound in a spiral fashion around a shaft of the ratchet. During use to restrain a vehicle against vertical movement, bouncing of the vehicle subjects the strap and ratchet to a cyclical, tug-and-release type of loading. This results in the layers of webbing wrapped around the ratchet shaft sliding over one another with sufficient friction to cause heating within the spiral-wound webbing strap. Such heating may be of sufficient intensity and duration to melt and fuse the layers of webbing, preventing the strap from being unwound or even causing failure of the restraint strap during use.

SUMMARY OF THE INVENTION

Accordingly, it is an object of the present invention to provide a restraint strap and ratchet assembly which is uniquely adapted for use in combination with a wheel chocking system for securing an automotive vehicle against bouncing during transport on a flat-bed surface of a transport vehicle, and which substantially overcomes the above-mentioned disadvantages of the prior art.

The present invention provides a vehicle restraint assembly which resists becoming unhooked from the transport vehicle during bouncing of the restrained vehicle, and which is less susceptible to frictional heating between layers of webbing wound around the ratchet.

In general, these objectives are achieved by a restraint assembly comprising a synthetic, woven webbing strap having a first end which is cut cold rather than heat cut and sealed; a standard, off-the-shelf ratchet mechanism engaged with the first end to wind up the strap; a vehicle attachment hook attached to a second, free end of the strap; and a J-shaped hook for engaging a hole or eyelet on the transport vehicle, the J-hook having a return bend that is at least substantially 180° in arc length and an extended free end.

The particular geometry of the J-hook serves to substantially prevent the ratchet mechanism from becoming disengaged from the transport vehicle due to bouncing of the restrained automotive vehicle on its suspension. Cold cutting the end of the strap result in a soft, brush-like tip, rather than a hard bead of re-solidified plastic material as is caused by the heat cutting and sealing process normally used to cut synthetic webbing. It has been found that eliminating this hard bead of plastic substantially reduces the frictional heating of the webbing wound within the ratchet which is caused by cyclical tension loading due to bouncing of the restrained vehicle.

According to a further feature of the invention, a method is provided to securing an automotive vehicle to a transport vehicle by placing wheel chocks adjacent front and rear wheels of the vehicle and attaching adjustable-length restraint straps between the automotive vehicle and the transport vehicle to draw the automotive vehicle downward and at least partially compress a suspension system of the automotive vehicle.

DETAILED DESCRIPTION OF THE DRAWINGS

FIG. 1 is a perspective view an automotive vehicle secured to a transport vehicle by wheel chocks and the invention restraint assemblies;

FIG. 2 is an enlarged view of one of the invention restraint assemblies during use;

FIG. 3 is a side view of the vehicle restraint assembly according to present invention;

FIG. 4 is a top view of the restraint assembly of FIG. 2;

FIG. 5 is a partial perspective view of an end of the webbing strap of the present invention; and FIG. 6 is a side view of a prior art hook used to attach a ratchet mechanism to a transport vehicle.

DETAILED DESCRIPTION OF THE PREFERRED EMBODIMENT

As depicted in FIGS. 1 and 2, the invention restraint assembly, generally indicated by reference numeral 10, is used to restrain and partially immobilize an automotive vehicle 12 such as a van with respect to a transport vehicle 14. The restraint assembly 10 is intended for use in combination with wheel chocks 16 which restrain the automotive vehicle 12 against forward and rearward movement. The transport vehicle 14 has a transport surface 14a onto which the van is driven or otherwise placed, and a plurality of the restraint assemblies 10, usually one adjacent each chocked vehicle wheel, are connected between the vehicle 12 and the transport surface 14a and tightened, as described in greater detail hereinbelow, to draw the vehicle downward and prevent bouncing of the vehicle on its suspension system.

Referring now to FIGS. 3 and 4, a motor vehicle restraint assembly 10 according to the present invention comprises a ratchet mechanism 18, a flexible strap 20 having a first end 20a engaged with the ratchet, a vehicle attachment hook 22 attached to the strap 20 adjacent its second end 20b, and a J-hook 24 attached to the ratchet.

The ratchet mechanism 18 is of the type generally known in the art, such as the ratchet mechanism disclosed in U.S. Pat. No. 5,560,086, the disclosure of which is incorporated herein by reference. The ratchet mechanism 18 comprises a take-up shaft 26 with a slot 28 passing through the diameter thereof, a base arm 30 and an operating arm 32 pivotally coupled together at the take-up shaft 26. As best seen in FIG. 4, the first end 20a of the strap passes through the slot 28 in the take-up shaft 26. Movement of the operating arm 32 in a counter-clockwise direction relative to the base arm 30 causes the take-up shaft 26 to rotate, resulting in the strap 20 being wound in a spiral fashion about the shaft and thereby shortened. A ratchet gear and pawl mechanism 34 prevents the shaft 26 from turning in the clockwise direction and allowing the strap 20 to unwind until a catch is released.

The strap 20 is a woven webbing formed from an organic filament, such as polyester or nylon, and in a preferred embodiment of the invention is on the order of two inches wide. It has been found that a polyester strap two inches wide and having a rated load bearing capacity of 12,000 pounds exhibits adequate performance in the operational environment for with the invention restraint assembly 10 is intended.

The vehicle attachment hook 22 has a geometry adapted to mate with a hole in a vehicle chassis or frame component and resist all but intentional disengagement therefrom. The hook 22 shown is of a configuration to match the mating holes formed in the frame of the General Motors Corporation G-Van. The vehicle attachment hook 22 is preferably cast iron.

The strap 20 is secured to the ratchet mechanism 18 by passing the first end 20a through the slot 28 in the take-up shaft 26 and stitching the end to the body of the strap. Similarly, the vehicle attachment hook 22 is attached to the strap 20 by passing the second end 20b of the strap through an eyelet in the hook and stitching the end to the body of the strap 20. As best seen in FIG. 5, the first end 20a of the strap has a soft, brush-like tip 36 which is formed by using a cold cutting process to cut the strap to length. This is in contrast to the prior art heat cutting process previously employed to cut lengths of synthetic webbing for use in ratchet mechanisms.

In the prior art heat cutting process, a blade is electrical resistance heated to a temperature sufficient to melt through the webbing strap. This results in the ends of the individual filaments making up the strap being fused together when the melted plastic resolidifies, leaving a hard bead of plastic extending along the cut edge of the strap tip. The heat cutting process has the advantage of sealing the tip to prevent fraying or unravelling of the strap during use. In most product applications this is a desirable objective, and the presence of the hard bead of plastic at the end of the strap has no adverse consequences. In the environment in which the invention restraint assembly is to be used, however, the presence of a hard bead of plastic at the end of the strap adjacent the ratchet mechanism 18 has been found to drastically impair the performance of the restraint assembly.

During use to restrain a vehicle against vertical movement, bouncing of the vehicle subjects the strap 20 and ratchet 18 to a cyclical, tug-and-release type of loading. This results in spiral length of webbing wrapped around the ratchet shaft 26 being rapidly and alternatingly pulled tight then relaxed. As this occurs, the layers of webbing slide over one another with sufficient friction to cause heating within the spiral-wound webbing strap 20. Such heating may be of sufficient intensity and duration to melt and fuse the layers of webbing, preventing the strap 20 from being unwound or even causing failure of the restraint strap during use. It has been found that the frictional heating of the strap 20 is magnified by the presence of a hard plastic bead at the first end of the strap, the end which is wrapped around the ratchet take-up shaft 26.

The cold cutting process used in the present invention results in the cut tip 36 of the strap 20 being soft rather than a hard, re-solidified plastic bead or strip as is left by the heat cutting process. This softness is critical to proper functioning of the invention restraint assembly 10 because it has been found to reduce the amount of frictional heating occurring when the strap 20 is wound around the ratchet take-up shaft 26 and subjected to cyclical tension loading.

It may not be strictly necessary that the second end 20b of the webbing strap have the soft tip produced by the cold cutting process, since in most vehicle restraint applications the webbing strap will not be shortened to such an extent that a hard plastic bead at the location where the second end 20b is stitched to the body of the strap is wound around the take-up shaft 26. However, it is most likely desirable for manufacturing reasons to produce straps having cold cut tips at both ends.

The J-hook 24 comprises a straight shank 24a attached to the ratchet mechanism 18, a curved bight 24b and a free end 24c extending back toward the ratchet. The bight 24b is approximately 180° in arc length so that the free end 24c is substantially parallel to the shank 24a. In the preferred embodiment of the invention, the overall length of the J-hook 24 from its point of attachment to the ratchet mechanism 18 to the far end of the bight 24b (labelled as distance L in FIG. 4) is approximately four inches, and free end 24c of the J-hook 24 terminates approximately 2.25 inches from the far end of the bight 24b (distance D in FIG. 4). This preferred hook geometry has been found to substantially eliminate the possibility of the J-hook 24 becoming disengaged from the transport vehicle 14 due to bouncing of the vehicle during shipment.

In operational use, the automotive vehicle restraint assembly 10 is attached to the automotive vehicle 12 after the vehicle is positioned on the transport vehicle transport surface 14a and the vehicle is immobilized by wheel chocks 16 placed in contact with the vehicle's wheels. The vehicle attachment hook 22 is inserted through an attachment hole (not shown) formed in the frame or chassis 12a of the vehicle and the free end 24c of the J-hook 24 is then passed through a hole 38 in a rail 40 or other structure of the vehicle support surface. In most cases, one vehicle restraint assembly 10 is positioned adjacent each of the four chocked wheels of the vehicle. After the vehicle restraint assembly 10 is attached between the automotive vehicle 12 and the transport surface 14a, the operating arm 32 of the ratchet mechanism 18 is actuated to wind the strap 20 around the take-up shaft 26, thereby shortening the overall length of the restraint assembly 10 and drawing the vehicle 12 downward, compressing the vehicle's suspension.

With the restraint assemblies 10 tightened downward to compress the automotive vehicle suspension approximately two inches, it has been found that the J-hooks 24 will remain engaged with their respective holes 38 in the rail 40 in spite of downward movement of the vehicle body due to bouncing when the transport vehicle 14 is in motion. Such bouncing does, however, place a cyclical tension loading on the straps 20 and ratchet mechanisms 18 which causes a greater amount of wear than occurs in a static loading condition. This wear is minimized by the soft, cold cut tip 36 of the strap 20.

After the invention restraint assembly 10 is used to ship a vehicle any substantial distance, it is recommended that the restraint assembly be inspected for signs of damage and wear. In some cases, it may be necessary to replace the webbing strap 20 after each use. It is recommended that the user of the invention restraint assembly utilize an inspection and refurbishment procedure wherein after each use of the restraint assembly it is returned to an inspection facility prior to a subsequent use. At the inspection facility, the restraint assembly is inspected for signs of wear and/or damage, and the webbing strap 20 is replaced if necessary. The refurbished restraint assembly is then returned to the vehicle shipper for re-use.

When the invention vehicle restraint assemblies 10 are properly tensioned and used in combination with wheel chocks 16 for restraining forward and rearward movement of the vehicle, the geometry of the J-hook 24 ensures secure engagement with the transport vehicle 14 so that the hook will not become disengaged due to bouncing movement of the automotive vehicle 12. Further, the soft, cold cut tip 36 of the webbing strap 20 decreases the severity of frictional heating within the windings of the strap 20 around the ratchet mechanism take-up shaft 26, and thereby prevents failure, damage or excessive wear to the restraint assembly during.

The invention claimed is:

1. An automotive vehicle restraint assembly comprising:
    a synthetic webbing strap having a first end which is cold cut and an opposite second end;
    a ratchet mechanism engaged with the strap adjacent the first end;
    a vehicle attachment hook attached to the strap adjacent the second end; and
    a J-hook attached to the ratchet mechanism and having a return bend of at least approximately 180° in arc length.

2. The restraint assembly according to claim 1 wherein a free end of the J-hook extends at least two inches from an end of a bight of the hook.

3. The restraint assembly according to claim 1 wherein the strap is made from a woven polyethylene material.

4. The restraint assembly according to claim 3 wherein the strap has a rated load bearing capacity of approximately 12,000 pounds.

5. The restraint assembly according to claim 1 wherein the strap second end is cold cut.

6. An automotive vehicle restraint assembly comprising:
    a ratchet mechanism;
    a synthetic webbing strap having first and second cold cut ends, the strap secured to the ratchet mechanism for take-up by passing the first end of the strap through the ratchet mechanism and sewing the first end to the strap;
    a vehicle attachment hook secured to the strap adjacent the second end thereof by passing the second end of the strap through an eyelet of the hook and sewing the second end to the strap; and
    a J-hook attached to the ratchet mechanism and having an extended free end.

* * * * *